United States Patent
Chen (10) Patent No.: US 12,108,471 B2
(45) Date of Patent: Oct. 1, 2024

(54) METHOD AND APPARATUS FOR QUICKLY PAIRING DUAL-MODE WIRELESS DEVICE

(71) Applicant: YEALINK (XIAMEN) NETWORK TECHNOLOGY CO., LTD., Fujian (CN)

(72) Inventor: Jinhong Chen, Fujian (CN)

(73) Assignee: YEALINK (XIAMEN) NETWORK TECHNOLOGY CO., LTD., Xiamen (CN)

( * ) Notice: Subject to any disclaimer, the term of this patent is extended or adjusted under 35 U.S.C. 154(b) by 435 days.

(21) Appl. No.: 17/566,687

(22) Filed: Dec. 31, 2021

(65) Prior Publication Data

US 2022/0210851 A1    Jun. 30, 2022

(30) Foreign Application Priority Data

Dec. 31, 2020 (CN) .......................... 202011641301.4

(51) Int. Cl.
*H04W 12/50* (2021.01)
*H04W 76/14* (2018.01)

(52) U.S. Cl.
CPC ........... *H04W 76/14* (2018.02); *H04W 12/50* (2021.01)

(58) Field of Classification Search
CPC ....... H04W 76/19; H04W 4/80; H04W 76/14; H04W 76/27; H04W 92/18; H04W 84/18; H04W 88/04; H04W 48/08; H04W 48/16; H04W 76/10; H04W 12/50; H04W 12/037; H04W 84/20; H04W 4/06; H04W 12/06; H04W 8/005
See application file for complete search history.

(56) References Cited

U.S. PATENT DOCUMENTS

| | | | | |
|---|---|---|---|---|
| 10,149,159 B1* | 12/2018 | Perfitt | .................... | H04L 9/3265 |
| 10,299,300 B1* | 5/2019 | Young | ...................... | H04R 3/12 |
| 2004/0128395 A1* | 7/2004 | Miyazaki | ............ | G06F 21/1011 |
| | | | | 713/176 |
| 2011/0028091 A1* | 2/2011 | Higgins | .............. | H04L 63/0492 |
| | | | | 455/41.2 |
| 2015/0264724 A1* | 9/2015 | Yao | ........................ | H04W 12/06 |
| | | | | 455/41.2 |
| 2015/0295915 A1* | 10/2015 | Xiu | .......................... | H04L 67/55 |
| | | | | 726/7 |
| 2016/0006263 A1* | 1/2016 | Shichino | .................. | H02J 50/80 |
| | | | | 307/104 |
| 2016/0006724 A1* | 1/2016 | Vlot | ........................ | G06F 21/72 |
| | | | | 713/156 |

(Continued)

*Primary Examiner* — Cindy Trandai (57) ABSTRACT

The present disclosure provides a method and apparatus for quickly pairing a dual-mode Bluetooth device. The method is applied to a master device, and includes: receiving, by the master device, Bluetooth identification information broadcast by a surrounding slave device; checking, by the master device, the Bluetooth identification information; and if the Bluetooth identification information is correct, performing, by the master device, Bluetooth pairing with the slave device. The method for quickly pairing a dual-mode Bluetooth device provided in the present disclosure simplifies a pairing operation and increases a pairing speed without increasing a cost. In addition, a pairing condition is not limited by a system version of a device, achieving high cost performance and strong applicability.

15 Claims, 7 Drawing Sheets

(56) References Cited

U.S. PATENT DOCUMENTS

| | | | | |
|---|---|---|---|---|
| 2016/0094934 A1* | 3/2016 | Yang | ................ | H04W 8/005 |
| | | | | 455/41.2 |
| 2016/0278006 A1* | 9/2016 | Lee | ................ | H04W 12/04 |
| 2017/0026778 A1* | 1/2017 | Yamada | ................ | H04W 12/08 |
| 2017/0230524 A1* | 8/2017 | Kawaguchi | ................ | H04N 1/00129 |
| 2019/0253857 A1* | 8/2019 | Li | ................ | H04W 4/80 |
| 2019/0306711 A1* | 10/2019 | Golsch | ................ | H04W 4/80 |
| 2019/0342933 A1* | 11/2019 | Li | ................ | H04W 48/18 |
| 2019/0372679 A1* | 12/2019 | Levionnais | ................ | H04W 4/20 |
| 2020/0186366 A1* | 6/2020 | Klink | ................ | H04W 12/35 |
| 2020/0382951 A1* | 12/2020 | Lee | ................ | H04W 12/037 |
| 2020/0413403 A1* | 12/2020 | Umehara | ................ | H04W 4/50 |
| 2021/0076435 A1* | 3/2021 | Cheong | ................ | H04W 4/80 |
| 2022/0070971 A1* | 3/2022 | Wang | ................ | H04W 4/90 |
| 2022/0191027 A1* | 6/2022 | Gan | ................ | G06N 3/08 |
| 2022/0330029 A1* | 10/2022 | Wang | ................ | H04W 12/108 |
| 2023/0089577 A1* | 3/2023 | Huang | ................ | H04W 76/14 |
| | | | | 455/456.6 |
| 2024/0097920 A1* | 3/2024 | Robertson | ................ | H04L 9/3271 |

* cited by examiner

METHOD AND APPARATUS FOR QUICKLY PAIRING DUAL-MODE WIRELESS DEVICE

CROSS-REFERENCE TO RELATED APPLICATIONS

The present application claims the benefit of Chinese Patent Application No. 202011641301.4 filed on Dec. 31, 2020, the contents of which are hereby incorporated by reference.

TECHNICAL FIELD

The present disclosure relates to the technical field of wireless communication, and in particular, to a method and apparatus for quickly pairing a dual-mode Bluetooth device.

BACKGROUND

The first step of using a classic Bluetooth device is to pair the classic Bluetooth device with a mobile phone or another device, which will directly determine whether a user can easily use the classic Bluetooth device. At present, according to a common open Bluetooth pairing method on the market, the user needs to enter a "setting" interface of the mobile phone and a "Bluetooth" device interface in sequence, and then find a to-be-paired device in a Bluetooth device list and tap a pairing button. This operation is relatively troublesome. Moreover, when there are many Bluetooth devices or Bluetooth devices with duplicate names around the user, it is often difficult for the user to quickly find the to-be-paired device. Therefore, how to provide a simple and unrestricted method for quickly pairing a dual-mode Bluetooth device by an Android device is an urgent problem to be resolved.

SUMMARY

The present disclosure is intended to provide a method and apparatus for quickly pairing a dual-mode Bluetooth device. According to this method, a dual-mode Bluetooth device informs an App of a classic Bluetooth MAC address of the dual-mode Bluetooth device by a Bluetooth low energy module (BLE) broadcast, such that the dual-mode Bluetooth device performs pairing with a master device directly based on the MAC address, thereby simplifying a pairing operation and increasing a pairing speed without increasing a cost. In addition, a pairing condition is not limited by a system version, achieving strong applicability.

To overcome the defects in the prior art, an embodiment of the present disclosure provides a method for quickly pairing a dual-mode Bluetooth device, where the method includes:
  receiving, by a master device, Bluetooth identification information broadcast by a surrounding slave device; and
  checking, by the master device, the Bluetooth identification information, and if the Bluetooth identification information is correct, performing, by the master device, Bluetooth pairing with the slave device.

The Bluetooth identification information is broadcast in any one of the following Bluetooth pairing manners: BLE pairing, classic Bluetooth pairing, secure simple pair (SSP), and secure connections (SC).

The Bluetooth identification information is broadcast in any one of the following non-Bluetooth pairing manners: out of band (OOB) pairing and broadcasting based on a specific frequency band.

The Bluetooth identification information includes plaintext information and encrypted information of the slave device.

The checking the Bluetooth identification information specifically includes:
  determining whether the plaintext information matches information of the master device, and if the plaintext information matches the information of the master device, decrypting the encrypted information to obtain decrypted information; and
  determining whether the decrypted information matches the plaintext information, and if the decrypted information matches the plaintext information, performing pairing with the slave device in a specific pairing manner.

The decrypting the encrypted information to obtain decrypted information specifically includes: decrypting the encrypted information by a public key, to obtain the decrypted information.

An embodiment of the present disclosure provides a method for quickly pairing a dual-mode Bluetooth device, where the method is applied to a master device, and includes:
  receiving a BLE broadcast sent by a surrounding slave device, where the BLE broadcast contains plaintext information and encrypted information;
  determining whether the plaintext information matches information of the master device, and if the plaintext information matches the information of the master device, decrypting the encrypted information by a public key, to obtain decrypted information; and
  determining whether the decrypted information matches the plaintext information, and if the decrypted information matches the plaintext information, performing pairing with the slave device based on a classic Bluetooth MAC address.

Preferably, when the plaintext information does not match the information of the master device, or the decrypted information does not match the plaintext information, receiving again the BLE broadcast sent by the surrounding slave device.

Preferably, before the decrypting the encrypted information by a public key, to obtain decrypted information, the method further includes:
  reading an RSSI value from the BLE broadcast, and determining whether the RSSI value is greater than a first preset threshold; and
  if the RSSI value is greater than the first preset threshold, terminating the determining for the pairing with the current slave device, and receiving the BLE broadcast of the surrounding slave device again; or
  if the RSSI value is not greater than the first preset threshold, decrypting the encrypted information by the public key, to obtain the decrypted information.

Preferably, the plaintext information includes a VID, a PID, and the classic Bluetooth MAC address of the slave device.

An embodiment of the present disclosure provides a method for quickly pairing a dual-mode Bluetooth device, where the method is applied to a slave device, and includes:
  sending a BLE broadcast to a surrounding master device, where the BLE broadcast contains plaintext information and encrypted information;
  determining whether the plaintext information matches information of the master device, and if the plaintext information matches the information of the master device, accepting a public key to decrypt the encrypted information to obtain decrypted information; and determining whether the decrypted information matches the plaintext information, and if the decrypted information matches the plaintext information, responding to a pairing request of the master device, and performing pairing with the master device based on a classic Bluetooth MAC address of the slave device.

Preferably, when the plaintext information does not match the information of the master device, or the decrypted information does not match the plaintext information, sending the BLE broadcast to the surrounding master device again.

Preferably, an encryption manner of the BLE broadcast includes encryption with an RSA private key, and a decryption manner of the BLE broadcast includes decryption with an RSA public key.

An embodiment of the present disclosure provides an apparatus for quickly pairing a dual-mode Bluetooth device, where the apparatus is applied to a master device, and includes:

a receiving module, configured to receive Bluetooth identification information sent by a slave device;

a check module, configured to check the Bluetooth identification information; and a pairing module, configured to: if the Bluetooth identification information is correct, perform pairing with the slave device in a specific pairing manner.

The receiving module includes a receiving submodule, and the receiving submodule is configured to receive a BLE broadcast sent by the slave device, where the BLE broadcast contains plaintext information and encrypted information;

the check module includes a first determining module and a decryption module, where the first determining module is configured to determine whether the plaintext information matches information of the master device; and the decryption module is configured to: when the plaintext information matches the information of the master device, decrypt the encrypted information by a public key, to obtain decrypted information; and the pairing module includes a pairing submodule, and the pairing submodule is configured to: determine whether the decrypted information matches the plaintext information, and if the decrypted information matches the plaintext information, perform pairing with the slave device based on a classic Bluetooth MAC address.

Preferably, the apparatus for quickly pairing a dual-mode Bluetooth device is applied to the master device, and further includes a second determining module, configured to:

read an RSSI value from the BLE broadcast, and determine whether the RSSI value is greater than a first preset threshold; and if the RSSI value is greater than the first preset threshold, terminate the determining for the pairing with the current slave device, and receive the BLE broadcast of the surrounding slave device again; or if the RSSI value is not greater than the first preset threshold, decrypt the encrypted information by the public key, to obtain the decrypted information.

An embodiment of the present disclosure provides an apparatus for quickly pairing a dual-mode Bluetooth device, where the apparatus is applied to a slave device, and includes:

a sending module, configured to send Bluetooth identification information to a surrounding master device;

a response module, configured to receive a result of checking the Bluetooth identification information by the master device; and a matching module, configured to: if the Bluetooth identification information is correct, respond to a pairing request of the master device, and perform pairing with the master device in a specific pairing manner.

The sending module includes a sending submodule, and the sending submodule is configured to send a BLE broadcast to the surrounding master device, where the BLE broadcast contains plaintext information and encrypted information;

the response module includes a response submodule, and the response submodule is configured to: when the plaintext information matches information of the master device, accept a public key to decrypt the encrypted information to obtain decrypted information; and the matching module includes a matching submodule, and the matching submodule is configured to: when the decrypted information matches the plaintext information, respond to the pairing request of the master device, perform pairing with the master device based on a classic Bluetooth MAC address of the slave device.

An embodiment of the present disclosure provides a smart Android device, including:

one or more processors; and a memory, coupled with the one or more processors, and configured to store one or more programs; where when the one or more programs are executed by the one or more processors, the one or more processors are enabled to implement the above method for quickly pairing a dual-mode Bluetooth device.

An embodiment of the present disclosure provides a computer-readable storage medium storing a computer program. The computer program is executed by a processor to implement the above method for quickly pairing a dual-mode Bluetooth device.

Compared with the prior art, the embodiments of the present disclosure have the following beneficial effects: According to the present disclosure, a dual-mode Bluetooth device informs an App of a classic Bluetooth MAC address of the dual-mode Bluetooth device by a BLE broadcast, such that the dual-mode Bluetooth device performs pairing with a master device directly based on the MAC address, thereby simplifying a pairing operation and increasing a pairing speed without increasing a cost. In addition, a pairing condition is not limited by a system version, achieving high cost performance and strong applicability.

DETAILED DESCRIPTION

The technical solutions of the embodiments of the present disclosure are clearly and completely described below with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

It should be understood that a smart Android device mentioned herein includes but is not limited to a smartphone, smart glasses, a smartwatch, a smart bracelet, a tablet, a laptop, a personal digital assistant, and another mobile Internet device that can carry out wireless communication.

It should be understood that step numbers in this specification are only intended to facilitate description, and are not used to limit a sequence of steps.

It should be understood that the terms used in the specification of the present disclosure are for the purpose of describing specific embodiments only and are not intended to limit the present disclosure. As used in the specification of the present disclosure and the appended claims, the singular forms "a", "an" and "the" are intended to include the plural forms unless the context clearly indicates otherwise.

The terms "include", "contain", and "comprise" indicate the existence of the described feature, entity, step, operation, element and/or component, but do not exclude the existence or addition of one or more other features, entities, steps, operations, elements, components and/or a combination thereof.

The term "and/or" refers to one of or any combination or all possible combinations of more of items listed in association, and includes these combinations.

First Aspect:

An embodiment of the present disclosure provides a method for quickly pairing a dual-mode Bluetooth device. The method includes: receiving, by a master device, Bluetooth identification information broadcast by a surrounding slave device; checking, by the master device, the Bluetooth identification information; and if the Bluetooth identification information is correct, performing, by the master device, Bluetooth pairing with the slave device. The Bluetooth identification information includes plaintext information and encrypted information of the slave device.

The checking the Bluetooth identification information specifically includes: determining whether the plaintext information matches information of the master device, and if the plaintext information matches the information of the master device, decrypting the encrypted information to obtain decrypted information; and determining whether the decrypted information matches the plaintext information, and if the decrypted information matches the plaintext information, performing pairing with the slave device in a specific pairing manner. The decrypting the encrypted information to obtain decrypted information specifically includes: decrypting the encrypted information by a public key, to obtain the decrypted information.

It can be understood by those skilled in the art that, in this embodiment, the slave device may broadcast the Bluetooth identification information in a Bluetooth pairing manner, including but not limited to BLE pairing, classic Bluetooth pairing, SSP, SC, and the like. In this embodiment, the slave device may alternatively broadcast the Bluetooth identification information in a non-Bluetooth pairing manner, including but not limited to OOB pairing, broadcasting based on a specific frequency band, and the like.

Figure 1:
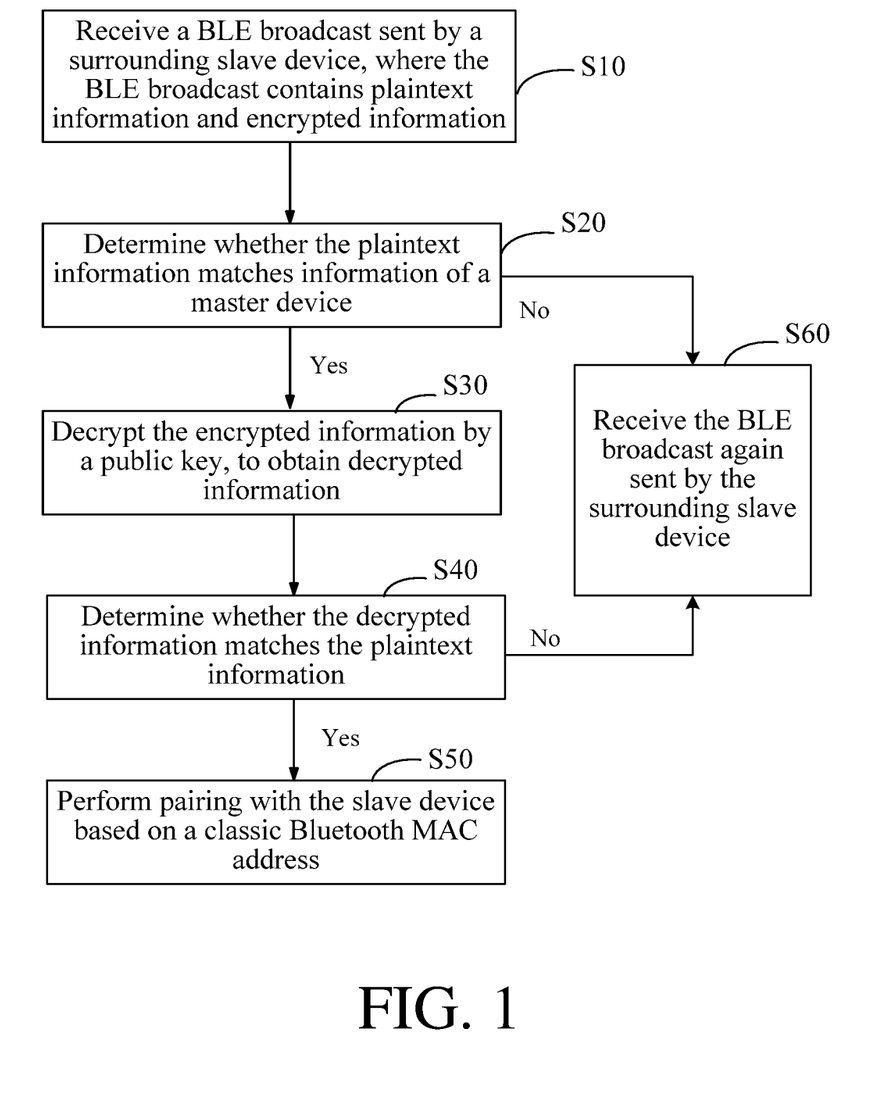
FIG. 1 is a schematic flowchart of a method for quickly pairing a dual-mode Bluetooth device and applied to a master device according to an embodiment of the present disclosure.

Specifically, referring to FIG. 1, a method for quickly pairing a dual-mode Bluetooth device is applied to a master device, and includes the following steps.

S10: Receive a BLE broadcast sent by a surrounding slave device, where the BLE broadcast contains plaintext information and encrypted information.

S20: Determine whether the plaintext information matches information of the master device; and
   if the plaintext information matches the information of the master device, perform S30; or
   if the plaintext information does not match the information of the master device, perform S60.

S30: Decrypt the encrypted information by a public key, to obtain decrypted information.

S40: Determine whether the decrypted information matches the plaintext information; and if the decrypted information matches the plaintext information, perform S50; or if the decrypted information does not match the plaintext information, perform S60.

S50: Perform pairing with the slave device based on a classic Bluetooth MAC address.

S60: Receive again the BLE broadcast sent by the surrounding slave device.

In this embodiment, it should be noted that the master device is a smart Android device and the slave device is a dual-mode Bluetooth device. In order to explain the steps of the present disclosure in detail, the smart Android phone is preferred and paired with the slave device by an App.

The first step of using each classic Bluetooth device is to pair the classic Bluetooth device with a mobile phone or another device, which directly determines whether a user can easily use the classic Bluetooth device. At present, common open Bluetooth pairing manners on the market mainly include traditional Bluetooth pairing, NFC pairing, and Google Fast Pair. However, the three pairing manners have their own disadvantages:

In the Bluetooth pairing manner, the user needs to enter a "setting" interface of the mobile phone and a "Bluetooth" device interface in sequence, and then find a to-be-paired device in a Bluetooth device list and tap a pairing button. This operation is relatively troublesome. Moreover, when there are many Bluetooth devices or Bluetooth devices with duplicate names around the user, it is often difficult for the user to quickly find the to-be-paired device. At present, most classic Bluetooth devices such as headphones are equipped with an Android App used by the user to perform device parameter setting and device upgrade. It is necessary to add a function of searching for a BLE broadcast of a paired classic Bluetooth device on the App. Therefore, Bluetooth pairing can be carried out by the App, which can simplify the traditional operation.

Although the NFC pairing manner is simple, a chip is required to support an NFC function, an NFC coil needs to be added to a product, and NFC information for Bluetooth pairing needs to be written during production, thereby increasing a cost of the product.

As a relatively simple pairing manner without increasing the cost of the product, Google Fast Pair can effectively overcome the shortcomings of the above two pairing manners. However, Google Fast Pair still has many limitations: Firstly, a paired classic Bluetooth device should carry out BLE broadcasting with low transmit power to limit a range in which the device can be searched. In addition, because the classic Bluetooth device also needs to respond to an inquiry through BR/EDR with high transmit power, transmit power is continuously switched. Most Bluetooth chips do not support automatic BLE and BR/EDR transmission with different transmit power. Due to a short transmission interval, it is not suitable to modify the transmit power for each transmission at an application layer. Secondly, a mobile phone using Google Fast Pair needs to use a Google account. In some regions, this function cannot be used because the Google account cannot be used. Thirdly, only Android 6.0 and above operating systems support Google Fast Pair. At present, about 15.1% of devices on the market have an Android system version below Android 6.0, so the product is highly limited.

In order to overcome the disadvantages of the above three manners, this embodiment uses a public and private key pair to encrypt and decrypt device information broadcast through BLE, and performs pairing based on the classic Bluetooth MAC address.

Specifically, in step S10, the master device receives BLE broadcasts sent by a plurality of surrounding slave devices, where the BLE broadcasts each include the plaintext information and the encrypted information. It should be noted that the plaintext information usually includes a VID, a PID, and the classic Bluetooth MAC address of the slave device. The encrypted information is information obtained after encrypting the plaintext information by a private key, in other words, an encrypted VID, PID, and classic Bluetooth MAC address. As a unique network identifier of each device in a network, a MAC address is written into hardware when the device is produced by a network device manufacturer. Each dual-mode Bluetooth device has its own VID and PID. The VID is a supplier ID, and the PID is a product identification code. The master device distinguishes different devices based on different VIDs and PIDs.

Further, when step S20 is performed, in other words, when the master device performs preliminary identification, after receiving the BLE broadcast, the App first preliminarily determines, based on the VID and the PID of the slave device, whether the slave device is a device of a same company, in other words, whether the slave device can be paired with the master device. If the slave device cannot be paired with the master device, step S60 is performed directly.

In other words, the pairing with the current slave device is discarded, and the BLE broadcast sent by the surrounding slave device is received again. When the BLE broadcast is received from the surrounding slave device again, the determining can be performed repeatedly on the slave device on which the determining has just been performed.

Preferably, when the pairing with the current slave device fails, the pairing with the slave device can also be performed in the classic pairing manner.

Further, if a determining result of step S20 indicates that the plaintext information matches the information of the master device, step S30 is continuously performed. Specifically, the encrypted information is decrypted by the public key, to obtain the decrypted information, in other words, a decrypted VID, PID, and classic Bluetooth MAC address of the slave device. Then step S40 is performed to determine whether the decrypted information matches the plaintext information of the slave device. Because VID and PID information can be imitated, decryption processing is performed and then the decrypted information is compared with the plaintext information, to effectively prevent imitated information, which is equivalent to further check. In this step, if the matching fails, step S60 is performed. If the matching is successful, the pairing with the slave device is performed based on the classic Bluetooth MAC address of the slave device.

In this embodiment of the present disclosure, a dual-mode Bluetooth device informs an App of a classic Bluetooth MAC address of the dual-mode Bluetooth device by a BLE broadcast, such that the dual-mode Bluetooth device performs pairing with a master device directly based on the MAC address. The master device verifies an identity of a slave device based on plaintext information to identify a to-be-paired slave device, and a user does not need to perform manual screening. This simplifies a pairing operation and increases a pairing speed without increasing a cost. In addition, a pairing condition is not limited by a system version, achieving high cost performance and strong applicability.

Figure 2:
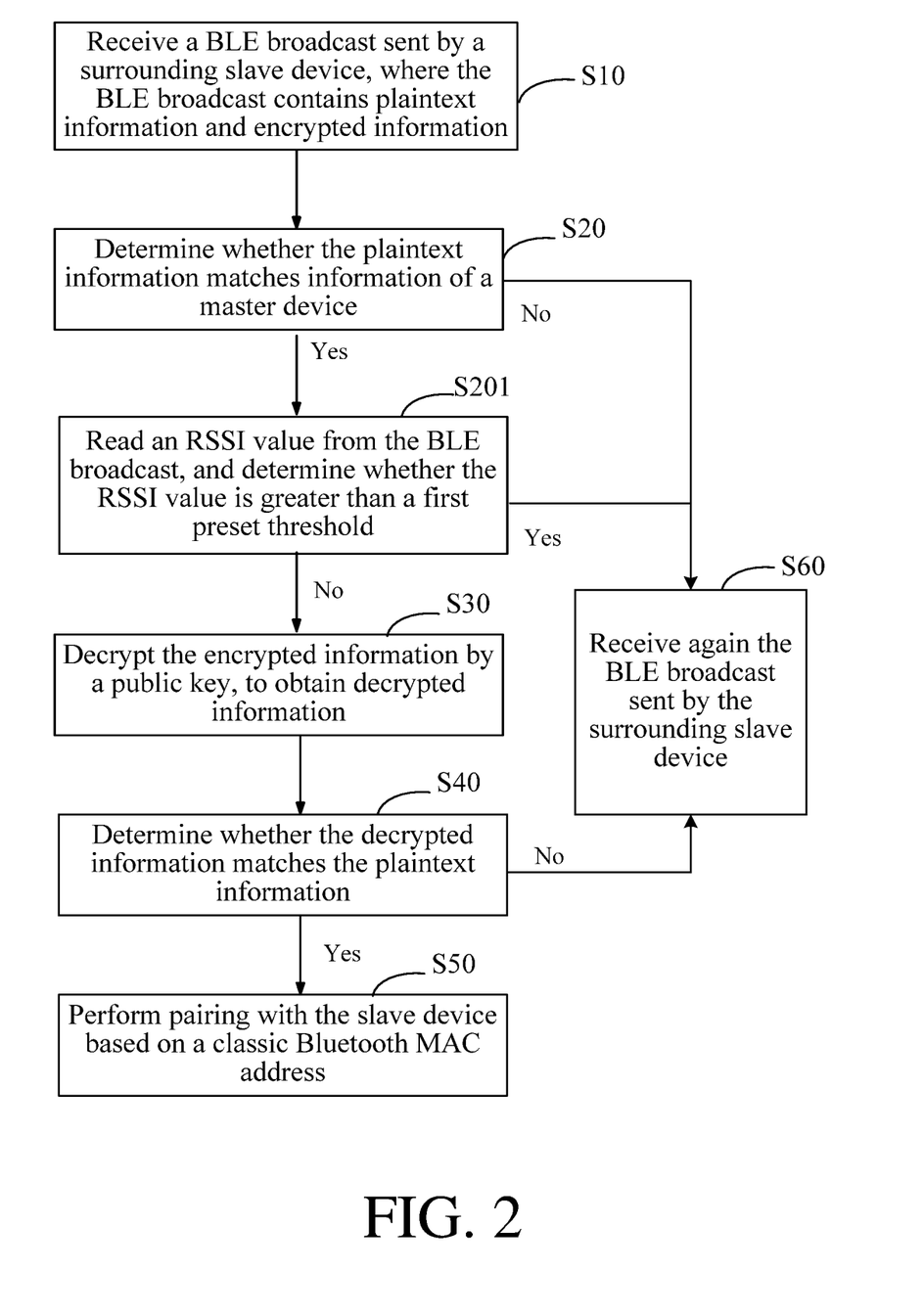
FIG. 2 is a schematic flowchart of a method for quickly pairing a dual-mode Bluetooth device and applied to a master device according to another embodiment of the present disclosure.

Referring to FIG. 2, an embodiment of the present disclosure provides another method for quickly pairing a dual-mode Bluetooth device and applied to a master device. In this method, step S201 is added between step S20 and step S30 in the previous embodiment, to read an RSSI value from the BLE broadcast of the slave device and determine whether the RSSI value is greater than a first preset threshold. If the RSSI value is greater than the first preset threshold, the slave device is not within a preset range that can be matched. In this case, step S60 is performed to discard the determining for the pairing with the slave device and continue to find a next qualified slave device. Similarly, although the determining has been performed on the slave device, the determining still can be performed repeatedly on the slave device. On the contrary, if the slave device is within the preset range, step S30 is performed again, in other words, the encrypted information is decrypted by the public key, to obtain the decrypted information. It can be understood that a matching distance may further be determined in this step to exclude some slave devices so as to prevent a misoperation caused by adding a device in a large range. It should be noted that the RSSI is an optional part of a wireless transmission layer and used to determine link quality and whether to increase broadcast transmission strength. The RSSI is a positioning technology that measures a distance between a signal point and a receiving point based on received signal strength, and then carries out positioning calculation based on the corresponding data. In this embodiment of the present disclosure, the RSSI value is read from the BLE broadcast of the slave device and determined to automatically identify and match the slave device, and the user does not need to manually perform a tap operation to trigger the pairing process, thereby simplifying the pairing operation and increasing the pairing speed.

Figure 3:
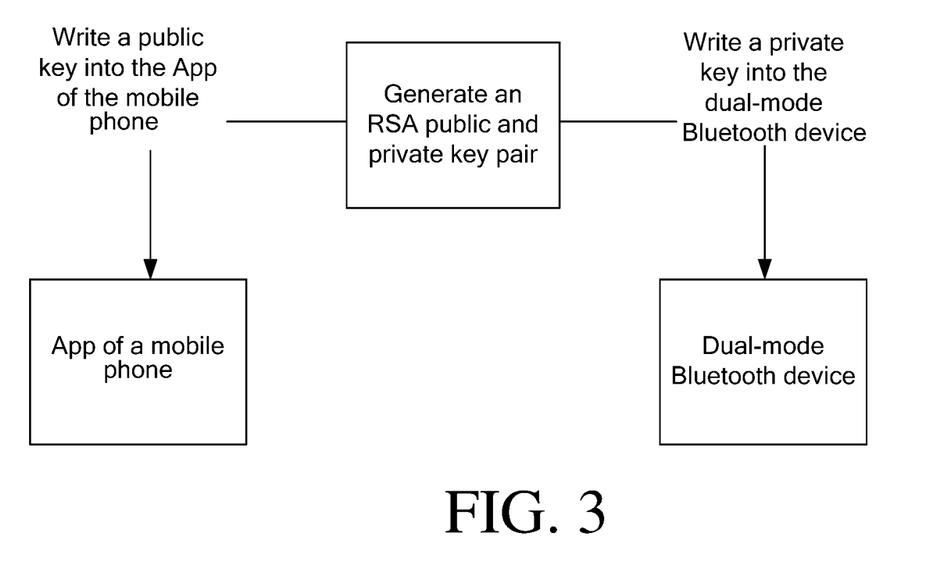
FIG. 3 is a schematic principle diagram of generating and allocating public and private keys according to an embodiment of the present disclosure.

FIG. 3 is a schematic principle diagram of generating and allocating public and private keys according to an embodiment of the present disclosure. An encryption manner of the BLE broadcast includes encryption with an RSA private key, and a decryption manner of the BLE broadcast includes decryption with an RSA public key. It can be understood that the public and private keys appear in pairs. One is responsible for encryption, and the other is responsible for decryption. The public key is public, and the private key is kept private. In this embodiment, the private key is written to the dual-mode Bluetooth device (slave device) during production, and the public key is saved by the App of the Android device (master device). It should be noted that another private encryption manner may be used for encryption. RSA encryption is only a preferred manner, and there is no limitation herein. Those skilled in the art can understand that common encryption and decryption manners may also be used in this embodiment, including but not limited to RSA encryption, AES encryption, Base64 encryption, and the like.

Figure 4:
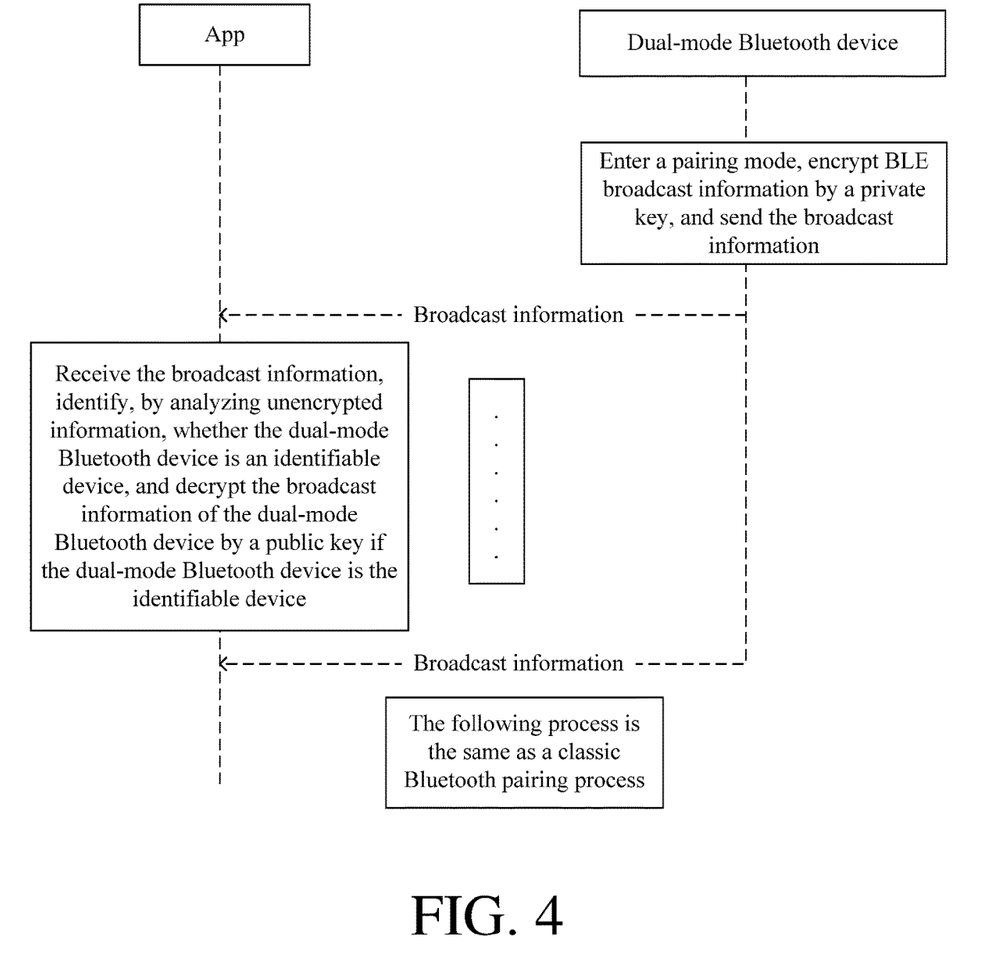
FIG. 4 shows steps of a method for quickly pairing a dual-mode Bluetooth device according to an embodiment of the present disclosure.

FIG. 4 shows a pairing process of a master device and a slave device according to an embodiment of the present disclosure. As shown in the figure, a dual-mode Bluetooth device enters a pairing mode, encrypts a BLE broadcast in advance by a private key, and sends the broadcast to a surrounding master device. Then, a smart Android device opens an App for Bluetooth pairing. After receiving the broadcast information, the App identifies the slave device by analyzing unencrypted information to determine whether the slave device is an identifiable device. If the slave device is the identifiable device, the App decrypts, by a public key, plaintext information of the BLE broadcast of the identifiable device, obtains a classic Bluetooth MAC address of the slave device, and then performs pairing based on the MAC address. If the slave device is not the identifiable device, pairing may be performed directly in the classic Bluetooth pairing manner.

Figure 5:
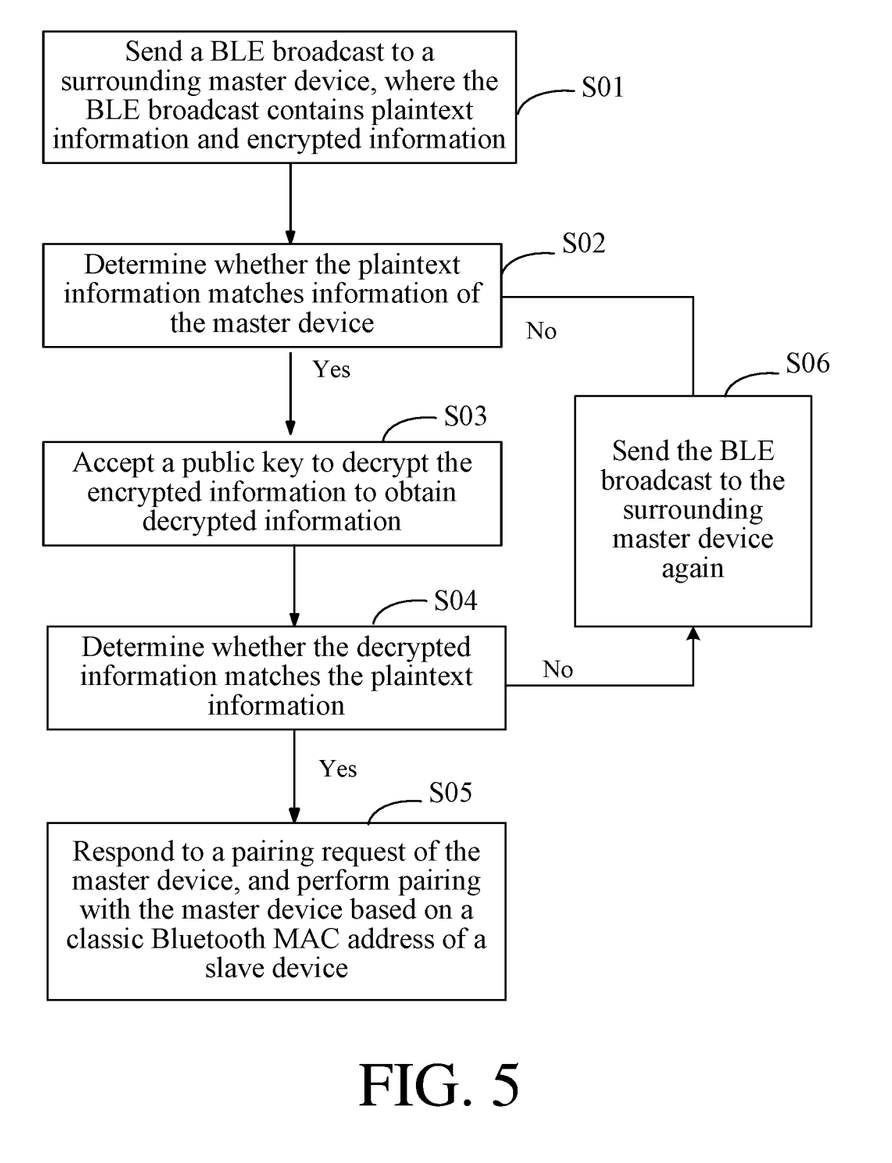
FIG. 5 is a schematic flowchart of a method for quickly pairing a dual-mode Bluetooth device and applied to a slave device according to an embodiment of the present disclosure.

Second Aspect:

Referring to FIG. 5, an embodiment of the present disclosure provides a method for quickly pairing a dual-mode Bluetooth device, where the method is applied to a slave device, and includes the following steps:

S01: Send a BLE broadcast to a surrounding master device, where the BLE broadcast contains plaintext information and encrypted information.

S02: Determine whether the plaintext information matches information of the master device; and if the plaintext information matches the information of the master device, perform S03; or if the plaintext information does not match the information of the master device, perform S06.

S03: Accept a public key to decrypt the encrypted information to obtain decrypted information.

S04: Determine whether the decrypted information matches the plaintext information; and if the decrypted information matches the plaintext information, perform S05; or if the decrypted information does not match the plaintext information, perform S06.

S05: Respond to a pairing request of the master device, and perform pairing with the master device based on a classic Bluetooth MAC address of the slave device.

S06: Send the BLE broadcast to the surrounding master device again.

Figure 6:
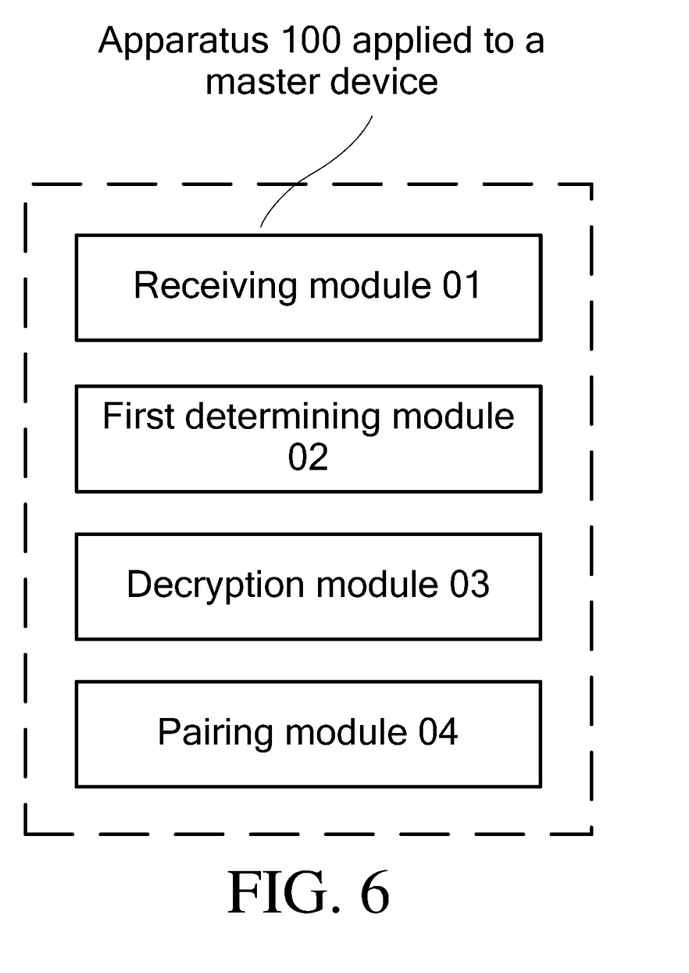
FIG. 6 is a schematic structural diagram of an apparatus for quickly pairing a dual-mode Bluetooth device and applied to a master device according to an embodiment of the present disclosure.

Third Aspect:

Referring to FIG. 6, an embodiment of the present disclosure provides an apparatus 100 for quickly pairing a dual-mode Bluetooth device, where the apparatus 100 is applied to a master device, and includes:

a receiving module 01, configured to receive Bluetooth identification information sent by a slave device;

a check module, configured to check the Bluetooth identification information; and a pairing module 04, configured to: if the Bluetooth identification information is correct, perform pairing with the slave device in a specific pairing manner.

The receiving module includes a receiving submodule, and the receiving submodule is configured to receive a BLE broadcast sent by the slave device, where the BLE broadcast contains plaintext information and encrypted information.

The check module includes a first determining module 02 and a decryption module 03.

The first determining module 02 is configured to determine whether the plaintext information matches information of the master device.

The decryption module 03 is configured to: when the plaintext information matches the information of the master device, decrypt the encrypted information by a public key, to obtain decrypted information.

The pairing module includes a pairing submodule, and the pairing submodule is configured to: determine whether the decrypted information matches the plaintext information, and if the decrypted information matches the plaintext information, perform pairing with the slave device based on a classic Bluetooth MAC address.

It can be understood that the four modules are configured to perform steps S10 to S60. Specifically, in step S10, the master device receives BLE broadcasts sent by a plurality of surrounding slave devices, where the BLE broadcasts each include the plaintext information and the encrypted information. It should be noted that the plaintext information usually includes a VID, a PID, and the classic Bluetooth MAC address of the slave device. The encrypted information is information obtained after encrypting the plaintext information by a private key, in other words, an encrypted VID, PID, and classic Bluetooth MAC address. As a unique network identifier of each device in a network, a MAC address is written into hardware when the device is produced by a network device manufacturer. Each dual-mode Bluetooth device has its own VID and PID. The VID is a supplier ID, and the PID is a product identification code. The master device distinguishes different devices based on different VIDs and PIDs.

Further, when step S20 is performed, in other words, when the master device performs preliminary identification, after receiving the BLE broadcast, an App first preliminarily determines, based on the VID and the PID of the slave device, whether the slave device is a device of a same company, in other words, whether the slave device can be paired with the master device. If the slave device cannot be paired with the master device, step S60 is performed directly.

In other words, the pairing with the current slave device is discarded, and the BLE broadcast sent by the surrounding slave device is received again. When the BLE broadcast is received from the surrounding slave device again, the determining can be performed repeatedly on the slave device on which the determining has just been performed.

Preferably, when the pairing with the current slave device fails, the pairing with the slave device can also be performed in a classic pairing manner.

Further, if a determining result of step S20 indicates that the plaintext information matches the information of the master device, step S30 is continuously performed. Specifically, the encrypted information is decrypted by the public key, to obtain the decrypted information, in other words, a decrypted VID, PID, and classic Bluetooth MAC address of the slave device. Then step S40 is performed to determine whether the decrypted information matches the plaintext information of the slave device. Because VID and PID information can be imitated, decryption processing is performed and then the decrypted information is compared with the plaintext information, to effectively prevent imitated information, which is equivalent to further check. In this step, if the matching fails, step S60 is performed. If the matching is successful, the pairing with the slave device is performed based on the classic Bluetooth MAC address of the slave device.

In an example embodiment, the apparatus for quickly pairing a dual-mode Bluetooth device is applied to the master device, and further includes a second determining module, configured to:

read an RSSI value from the BLE broadcast, and determine whether the RSSI value is greater than a first preset threshold; and if the RSSI value is greater than the first preset threshold, terminate the determining for the pairing with the current slave device, and receive the BLE broadcast of the surrounding slave device again; or if the RSSI value is not greater than the first preset threshold, decrypt the encrypted information by the public key, to obtain the decrypted information.

In this embodiment, the second determining module is mainly configured to perform step S201. Specifically, step S201 is added between step S20 and step S30, to read the RSSI value from the BLE broadcast of the slave device and determine whether the RSSI value is greater than the first preset threshold. If the RSSI value is greater than the first preset threshold, the slave device is not within a preset range that can be matched. In this case, step S60 is performed to discard the determining for the pairing with the slave device and continue to find a next qualified slave device. Similarly, although the determining has been performed on the slave device, the determining still can be performed repeatedly on the slave device. On the contrary, if the slave device is within the preset range, step S30 is performed again, in other words, the encrypted information is decrypted by the public key, to obtain the decrypted information. It can be understood that a matching distance may further be determined in this step to exclude some slave devices so as to prevent a misoperation caused by adding a device in a large range. It should be noted that the RSSI is an optional part of a wireless transmission layer and used to determine link quality and whether to increase broadcast transmission strength. The RSSI is a positioning technology that measures a distance between a signal point and a receiving point based on received signal strength, and then carries out positioning calculation based on the corresponding data.

In another example embodiment, the apparatus 100 for quickly pairing a dual-mode Bluetooth device includes a processor. The processor is configured to execute the above program modules stored in a memory, including the receiving module 01, the check module, the pairing module 04, the first determining module 02, the decryption module 03, the receiving submodule, the pairing submodule, and the second determining module.

Figure 7:
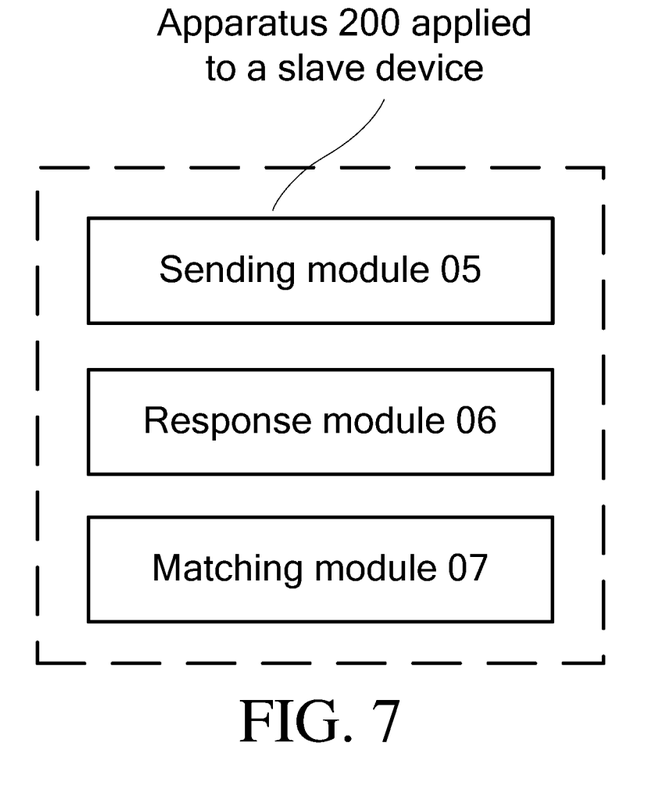
FIG. 7 is a schematic structural diagram of an apparatus for quickly pairing a dual-mode Bluetooth device and applied to a slave device according to an embodiment of the present disclosure.

Fourth Aspect:

Referring to FIG. 7, an embodiment of the present disclosure provides an apparatus 200 for quickly pairing a dual-mode Bluetooth device, where the apparatus 200 is applied to a slave device, and includes:

a sending module 05, configured to send Bluetooth identification information to a surrounding master device;

a response module 06, configured to receive a result of checking the Bluetooth identification information by the master device; and a matching module 07, configured to: if the Bluetooth identification information is correct, respond to a pairing request of the master device, and perform pairing with the master device in a specific pairing manner.

The sending module includes a sending submodule, and the sending submodule is configured to send a BLE broadcast to the surrounding master device, where the BLE broadcast contains plaintext information and encrypted information.

The response module includes a response submodule, and the response submodule is configured to: when the plaintext information matches information of the master device, accept a public key to decrypt the encrypted information to obtain decrypted information.

The matching module includes a matching submodule, and the matching submodule is configured to: when the decrypted information matches the plaintext information, respond to the pairing request of the master device, perform pairing with the master device based on a classic Bluetooth MAC address of the slave device.

In another example embodiment, the apparatus 200 for quickly pairing a dual-mode Bluetooth device includes a processor. The processor is configured to execute the above program modules stored in a memory, including the sending module 05, the response module 06, the matching module 07, the sending submodule, the response submodule, and the matching submodule.

Figure 8:
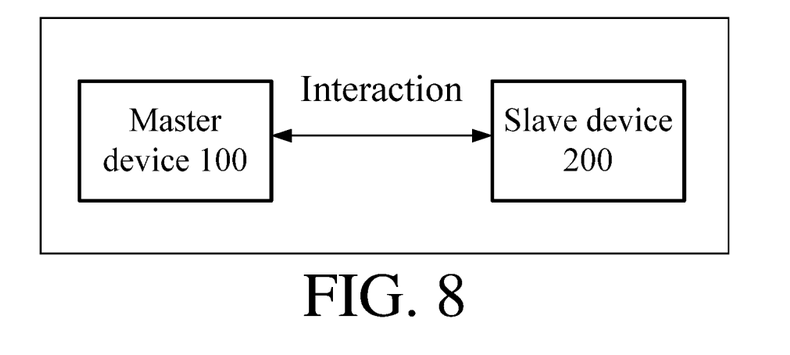
FIG. 8 is a schematic principle diagram of interaction between a master device and a slave device according to an embodiment of the present disclosure.

Referring to FIG. 8, an embodiment of the present disclosure shows interaction between a master device and a slave device.

Fifth Aspect:

In an example embodiment, a smart Android device is provided, including one or more processors, and a memory coupled with the one or more processors and configured to store one or more programs.

When the one or more programs are executed by the one or more processors, the one or more processors are enabled to implement the method for quickly pairing a dual-mode Bluetooth device according to any one of the above embodiments of the present disclosure.

The processor is configured to control an overall operation of the computer terminal device to complete all or a part of the steps of the above method for quickly pairing a dual-mode Bluetooth device. The memory is configured to store various types of data to support an operation on the computer terminal device. The data may include, for example, an instruction of any application program or method for performing an operation on the computer terminal device, as well as data related to the application program. The memory may be realized by any type of volatile or nonvolatile storage device or their combination, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The terminal device may be realized by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic components, and is configured to execute the method for quickly pairing a dual-mode Bluetooth device in any one of the above embodiments, and achieve a technical effect consistent with the technical effect achieved in the above method.

In an example embodiment, a computer-readable storage medium including a computer program is provided. The computer program is executed by a processor to implement the method for quickly pairing a dual-mode Bluetooth device in any one of the above embodiments. For example, the computer-readable storage medium may be the above memory including a program instruction. The program instruction may be executed by a processor of a computer terminal device to complete the method for quickly pairing a dual-mode Bluetooth device in any one of the above embodiments.

The descriptions above are preferred implementations of the present disclosure. It should be noted that for a person of ordinary skill in the art, various improvements and modifications can be made without departing from the principles of the present disclosure. These improvements and modifications should also be regarded as falling into the protection scope of the present disclosure.

The invention claimed is:

1. A method for quickly pairing a dual-mode Bluetooth device, wherein the method comprises:
   receiving, by a master device, Bluetooth identification information broadcast by a surrounding slave device; and
   checking, by the master device, the Bluetooth identification information, and when the Bluetooth identification information is correct, performing, by the master device, Bluetooth pairing with the slave device;
   wherein the Bluetooth identification information comprises plaintext information and encrypted information of the slave device;
   wherein the checking the Bluetooth identification information specifically comprises:
   determining whether the plaintext information matches information of the master device, and when the plaintext information matches the information of the master device, decrypting the encrypted information to obtain decrypted information; and
   determining whether the decrypted information matches the plaintext information, and when the decrypted information matches the plaintext information, performing pairing with the slave device in a specific pairing manner.

2. The method for quickly pairing a dual-mode Bluetooth device according to claim 1, wherein the Bluetooth identification information is broadcast in any one of the following Bluetooth pairing manners: Bluetooth low energy module (BLE) pairing, classic Bluetooth pairing, secure simple pair (SSP), and secure connections (SC).

3. The method for quickly pairing a dual-mode Bluetooth device according to claim 1, wherein the Bluetooth identification information is broadcast in any one of the following non-Bluetooth pairing manners: out of band (OOB) pairing and broadcasting based on a specific frequency band.

4. The method for quickly pairing a dual-mode Bluetooth device according to claim 1, wherein the decrypting the encrypted information to obtain decrypted information specifically comprises: decrypting the encrypted information by a public key, to obtain the decrypted information.

5. The method for quickly pairing a dual-mode Bluetooth device according to claim 4, wherein the method is applied to the master device, and comprises:
   receiving a BLE broadcast sent by the surrounding slave device, wherein the BLE broadcast contains the plaintext information and the encrypted information;
   determining whether the plaintext information matches the information of the master device, and when the plaintext information matches the information of the master device, decrypting the encrypted information by the public key, to obtain the decrypted information; and
   determining whether the decrypted information matches the plaintext information, and when the decrypted information matches the plaintext information, performing pairing with the slave device based on a classic Bluetooth MAC address.

6. The method for quickly pairing a dual-mode Bluetooth device according to claim 5, wherein
   when the plaintext information does not match the information of the master device, or the decrypted information does not match the plaintext information, receiving again the BLE broadcast sent by the surrounding slave device.

7. The method for quickly pairing a dual-mode Bluetooth device according to claim 5, wherein before the decrypting the encrypted information by a public key, to obtain the decrypted information, the method further comprises:
   reading a received signal strength indication (RSSI) value from the BLE broadcast, and determining whether the RSSI value is greater than a first preset threshold; and
   when the RSSI value is greater than the first preset threshold, terminating the determining for the pairing with the current slave device, and receiving the BLE broadcast of the surrounding slave device again; or
   when the RSSI value is not greater than the first preset threshold, decrypting the encrypted information by the public key, to obtain the decrypted information.

8. Method for quickly pairing a dual-mode Bluetooth device according to claim 5, wherein the plaintext information comprises a VID, a PID, and the classic Bluetooth MAC address of the slave device.

9. The method for quickly pairing a dual-mode Bluetooth device according to claim 5, wherein an encryption manner of the BLE broadcast comprises encryption with an RSA private key, and a decryption manner of the BLE broadcast comprises decryption with an RSA public key.

10. The method for quickly pairing a dual-mode Bluetooth device according to claim 4, wherein the method is applied to the slave device, and comprises:
    sending a BLE broadcast to the surrounding master device, wherein the BLE broadcast contains the plaintext information and the encrypted information;
    determining whether the plaintext information matches the information of the master device, and when the plaintext information matches the information of the master device, accepting the public key to decrypt the encrypted information to obtain the decrypted information; and
    determining whether the decrypted information matches the plaintext information, and when the decrypted information matches the plaintext information, responding to a pairing request of the master device, and performing pairing with the master device based on a classic Bluetooth MAC address of the slave device.

11. The method for quickly pairing a dual-mode Bluetooth device according to claim 10, wherein an encryption manner of the BLE broadcast comprises encryption with an RSA private key, and a decryption manner of the BLE broadcast comprises decryption with an RSA public key.

12. The method for quickly pairing a dual-mode Bluetooth device according to claim 4, wherein
when the plaintext information does not match the information of the master device, or the decrypted information does not match the plaintext information, sending the BLE broadcast to the surrounding master device again.

13. An apparatus for quickly pairing a dual-mode Bluetooth device, wherein the apparatus is applied to a master device, and comprises:
a receiving module, configured to receive Bluetooth identification information sent by a slave device;
a check module, configured to check the Bluetooth identification information; and
a pairing module, configured to: when the Bluetooth identification information is correct, perform pairing with the slave device in a specific pairing manner;
wherein the receiving module comprises a receiving submodule, and
the receiving submodule is configured to receive a BLE broadcast sent by the slave device, wherein the BLE broadcast contains plaintext information and encrypted information;
the check module comprises a first determining module and a decryption module, wherein
the first determining module is configured to determine whether the plaintext information matches information of the master device; and
the decryption module is configured to: when the plaintext information matches the information of the master device, decrypt the encrypted information by a public key, to obtain decrypted information; and
the pairing module comprises a pairing submodule, and
the pairing submodule is configured to: determine whether the decrypted information matches the plaintext information, and when the decrypted information matches the plaintext information, perform pairing with the slave device based on a classic Bluetooth MAC address.

14. The apparatus for quickly pairing a dual-mode Bluetooth device according to claim 13, further comprising a second determining module, configured to:
read an RSSI value from the BLE broadcast, and determine whether the RSSI value is greater than a first preset threshold; and
when the RSSI value is greater than the first preset threshold, terminate the determining for the pairing with the current slave device, and receive the BLE broadcast of the surrounding slave device again; or
when the RSSI value is not greater than the first preset threshold, decrypt the encrypted information by the public key, to obtain the decrypted information.

15. An apparatus for quickly pairing a dual-mode Bluetooth device, wherein the apparatus is applied to a slave device, and comprises:
a sending module, configured to send Bluetooth identification information to a surrounding master device;
a response module, configured to receive a result of checking the Bluetooth identification information by the master device; and
a matching module, configured to: when the Bluetooth identification information is correct, respond to a pairing request of the master device, and perform pairing with the master device in a specific pairing manner;
wherein the sending module comprises a sending submodule, and
the sending submodule is configured to send a BLE broadcast to the surrounding master device, wherein the BLE broadcast contains plaintext information and encrypted information;
the response module comprises a response submodule, and
the response submodule is configured to: when the plaintext information matches information of the master device, accept a public key to decrypt the encrypted information to obtain decrypted information; and
the matching module comprises a matching submodule, and
the matching submodule is configured to: when the decrypted information matches the plaintext information, respond to the pairing request of the master device, and perform pairing with the master device based on a classic Bluetooth MAC address of the slave device.

* * * * *